US00RE37631E

(19) United States
(12) Reissued Patent
Nanami et al.

(10) Patent Number: US RE37,631 E
(45) Date of Reissued Patent: Apr. 9, 2002

(54) EXHAUST TIMING CONTROL FOR A PLANING-TYPE BOAT

(75) Inventors: Masayoshi Nanami; Ryoichi Nakase, both of Hamamatsu (JP)

(73) Assignee: Sanshin Kogyo Kabushiki Kaisha (JP)

(21) Appl. No.: 09/621,102

(22) Filed: Jul. 20, 2000

Related U.S. Patent Documents

Reissue of:
(64) Patent No.: 5,782,214
Issued: Jul. 21, 1998
Appl. No.: 08/666,246
Filed: Jun. 20, 1996

(30) Foreign Application Priority Data

Nov. 28, 1995 (JP) ..... 7-309366

(51) Int. Cl.[7] ..... B63H 21/26
(52) U.S. Cl. ..... 123/65 PE
(58) Field of Search ..... 123/65 PE, 65 P, 123/65 SP

(56) References Cited

U.S. PATENT DOCUMENTS

| | | | | |
|---|---|---|---|---|
| 4,121,552 A | * | 10/1978 | Mithuo et al. | 123/65 PE |
| 4,202,297 A | * | 5/1980 | Oku et al. | 123/65 PE |
| 4,341,188 A | * | 7/1982 | Nerstrom | 123/65 PE |
| 4,388,894 A | * | 6/1983 | Tanaka et al. | 123/65 PE |
| 4,516,540 A | * | 5/1985 | Nerstrom | 123/65 PE |
| 4,793,347 A | * | 12/1988 | Taniuchi et al. | 123/65 PE |
| 4,986,780 A | | 1/1991 | Sougawa | |
| 4,998,510 A | | 3/1991 | Rognon | |
| 4,998,512 A | * | 3/1991 | Masuda et al. | 123/65 PE |
| 5,000,131 A | | 3/1991 | Masuda | |
| 5,190,006 A | * | 3/1993 | Motoyama et al. | 123/65 PE |
| 5,410,993 A | | 5/1995 | Masuda et al. | |
| 5,537,958 A | | 7/1996 | Nishimura et al. | |
| 5,598,813 A | * | 2/1997 | Masuda et al. | 123/65 PE |
| 5,605,119 A | * | 2/1997 | Maduda et al. | 123/65 PE |
| 5,827,096 A | | 10/1998 | Mineo | |
| 5,878,702 A | | 3/1999 | Motoyama et al. | |
| 5,885,120 A | | 3/1999 | Yamazaki et al. | |
| 5,885,122 A | | 3/1999 | Fujimoto | |
| 5,934,958 A | | 8/1999 | Ochiai | |
| 5,983,631 A | | 11/1999 | Mineo | |
| 6,007,392 A | | 12/1999 | Motose | |

OTHER PUBLICATIONS

Two–Stroke Top End Rebuilding; by Eric Gorr, undated but discussing exhaust control valves and some history of such valves.
Aprilia Extrema 125 Owners Manual pages; dated 1992.
Aprilia RS 125 Owners Manual pages; dated 1995.
CycleWorld Article; dated Apr. 1986.
Webpage discussing history of Yamaha's RD350.
Polaris Parts Manual (1997) pp. C3, 03–05–1 through 03–05–5 and 04–05–1 through 04–05–11.

* cited by examiner

*Primary Examiner*—Marguerite McMahon
(74) *Attorney, Agent, or Firm*—Knobbe, Martens, Olson & Bear, LLP

(57) ABSTRACT

A two-cycle internal combustion engine for a watercraft that includes a cylinder block having a cylinder bore, a piston reciprocating in the cylinder bore and an exhaust port formed in the cylinder block. An exhaust path extends from the cylinder bore for exhausting combustion products from the cylinder bore. An exhaust control valve cooperates with the exhaust port and is movable between at least a first position for advancing the closing of the exhaust port so as to increase the compression ratio in the engine and a second position for delaying the closing of the exhaust port so as to decrease the compression ratio in the engine. Means for controlling the exhaust control valve between the first and second position are provided and are controlled in response to a watercraft condition.

36 Claims, 6 Drawing Sheets

EXHAUST TIMING CONTROL FOR A PLANING-TYPE BOAT

Matter enclosed in heavy brackets [ ] appears in the original patent but forms no part of this reissue specification; matter printed in italics indicates the additions made by reissue.

BACKGROUND OF THE INVENTION

This invention relates to exhaust timing control for an internal combustion engine, and more particularly, to exhaust timing control for a two-cycle engine of a watercraft for producing optimal watercraft acceleration at all engine speeds and watercraft velocities.

The "personal watercraft" has become a very popular and growing segment of the watercraft market. This type of watercraft is comprised of a relatively small hull that defines a rider's area which is designed primarily to accommodate a rider and possibly one or two additional riders. Due to the space limitations and power demands of these watercraft, a two-cycle engine is typically provided to drive these watercraft.

As illustrated by curves A and B of FIG. 1, it has been recognized in the past that the maximum output of an engine can be increased by advancing the closing of the exhaust port. The cost of increasing the output by advancing the closing of the exhaust port is that an engine output trough occurs in the middle engine speed range, as illustrated in curve B. This output trough presents a problem because it tends to occur prior to the planing of the watercraft and at the same time the watercraft exhibits a crest in hull resistance. As a result of this overlapping output trough and hull resistance crest, a difficult-to-accelerate area occurs prior to planing.

Engine output troughs at low and medium engine speed ranges have been eliminated in the past by varying exhaust port timing through a variable exhaust control valve. At low and medium engine speed ranges the valve is moved to a position so that the closing of the exhaust port is advanced. By advancing the closing of the exhaust port in the low and medium engine speed ranges, the compression ratio in the engine is increased where power is needed the most. At high engine speeds, the valve is moved to a position so that the closing of the exhaust port is relatively delayed. By delaying the closing of the exhaust port in the high speed range, the compression ratio in the engine is decreased. A decreased compression ratio in the engine at high engine speeds is important for maintaining appropriate temperature control, avoiding excess pressures in the combustion chamber and avoiding pre-ignition and knocking in the engine. Variable exhaust control valve arrangements of the past would vary exhaust port timing by advancing or delaying the closing of the exhaust port based on pre-determined engine conditions, such as engine speed or exhaust pressure.

Although a variable exhaust control valve arrangement that varies exhaust port opening based solely on pre-determined engine conditions may be suitable for some vehicle uses, it is not ideal for a watercraft. A watercraft is unique in that the engine that propels the watercraft must overcome a large amount of hull resistance in the low and medium watercraft velocities before the watercraft reaches a planing velocity. By varying the exhaust port opening based on watercraft traveling conditions and pre-determined engine conditions, the engine is more responsive to the performance needs of the watercraft so that watercraft exhibits smoother acceleration as engine speed increases, especially in the low and medium watercraft velocity and engine speed ranges prior to planing.

It is therefore a primary object of the present invention to provide a personal watercraft with an engine that includes an exhaust control valve arrangement that varies exhaust port timing based on engine and watercraft traveling conditions.

Although these exhaust control valves are extremely effective in improving engine performance in a watercraft, they are susceptible to salt corrosion and sticking when the watercraft is used in a sea water environment. As is well known with many types of watercraft, exhaust gases from the watercraft engine are discharged through an exhaust system to the atmosphere either through the water, or near the water, in which the watercraft is operating. Salt may accumulate on the exhaust control valve caused by sea water entering the exhaust control system when the watercraft is capsized and righted or through marine air entering the induction system. Corrosion and sticking may occur between the valve and a respective sliding surface. This sticking prevents the exhaust control valve from operating in the manner intended.

It is therefore a further object of this invention to provide an improved exhaust system for a personal watercraft that prevents sticking and corrosion of the exhaust control valve caused by salt from sea water and air.

SUMMARY OF THE INVENTION

A two-cycle internal combustion engine for a watercraft that includes a cylinder block having a cylinder bore, a piston reciprocating in the cylinder bore and an exhaust port formed in the cylinder block. An exhaust path extends from the cylinder bore for exhausting combustion products from the cylinder bore. An exhaust control valve cooperates with the exhaust port and is movable between at least a first position for advancing the closing of the exhaust port so as to increase the compression ratio in the engine and a second position for delaying the closing of the exhaust port so as to decrease the compression ratio in the engine. Means for controlling the exhaust control valve between the first and second position are provided and are dependent upon a watercraft condition.

BRIEF DESCRIPTION OF THE DRAWINGS

FIG. 4 further illustrates the exhaust control valve of the present invention.

DETAILED DESCRIPTION OF THE PREFERRED EMBODIMENTS OF THE INVENTION

Figure 1:
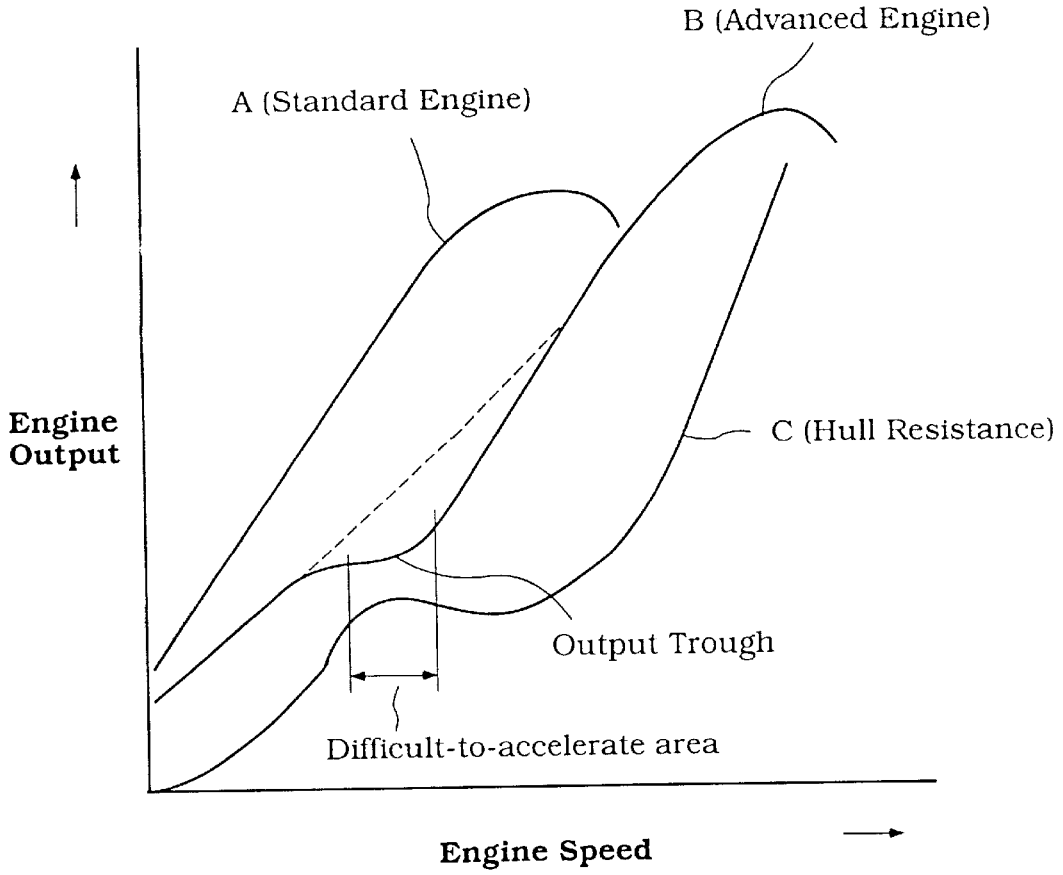
FIG. 1 is a graphical view with curves A and B showing engine output in relation to engine speed and curve C showing hull resistance of the watercraft in relation to engine speed.
Figure 2:
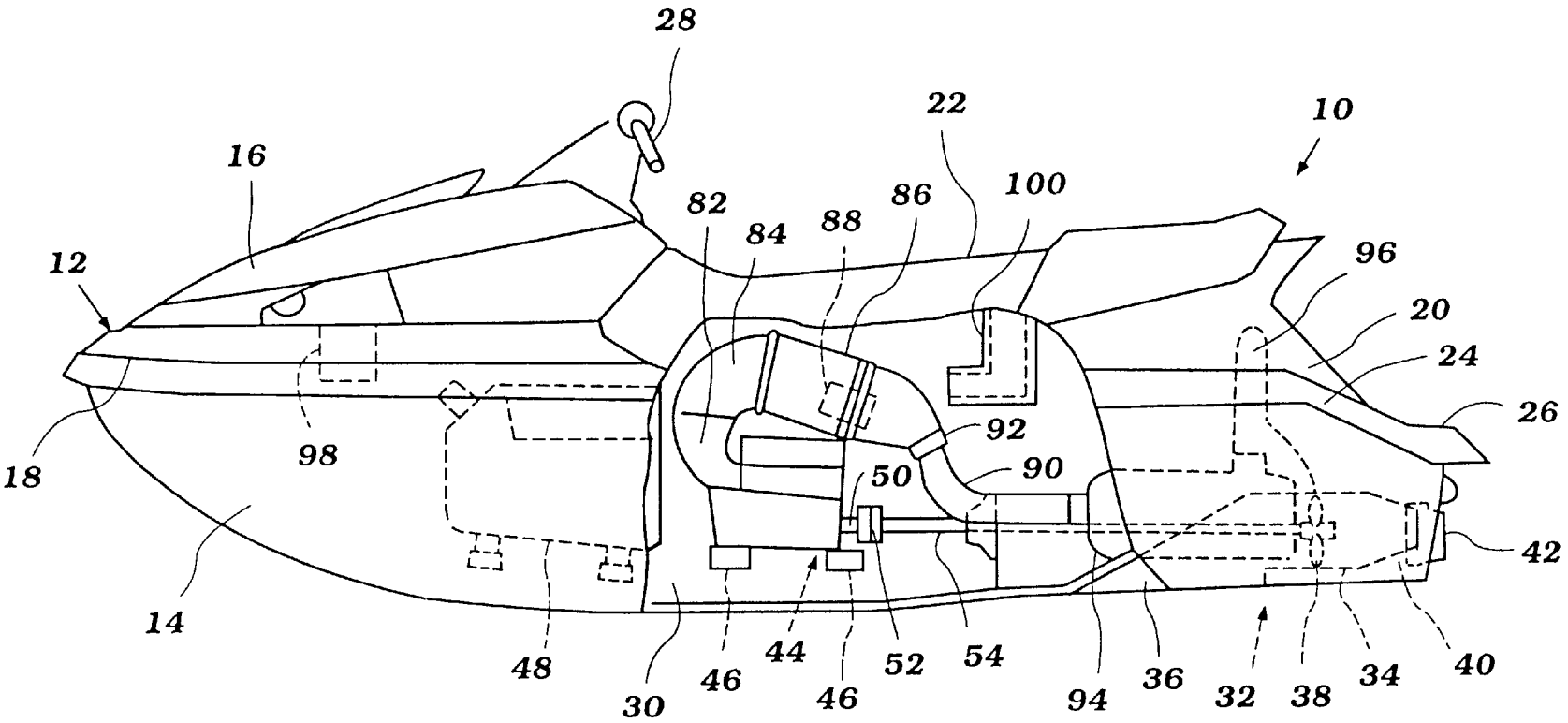
FIG. 2 is a side elevational view of the personal watercraft of the present invention.
Figure 3:
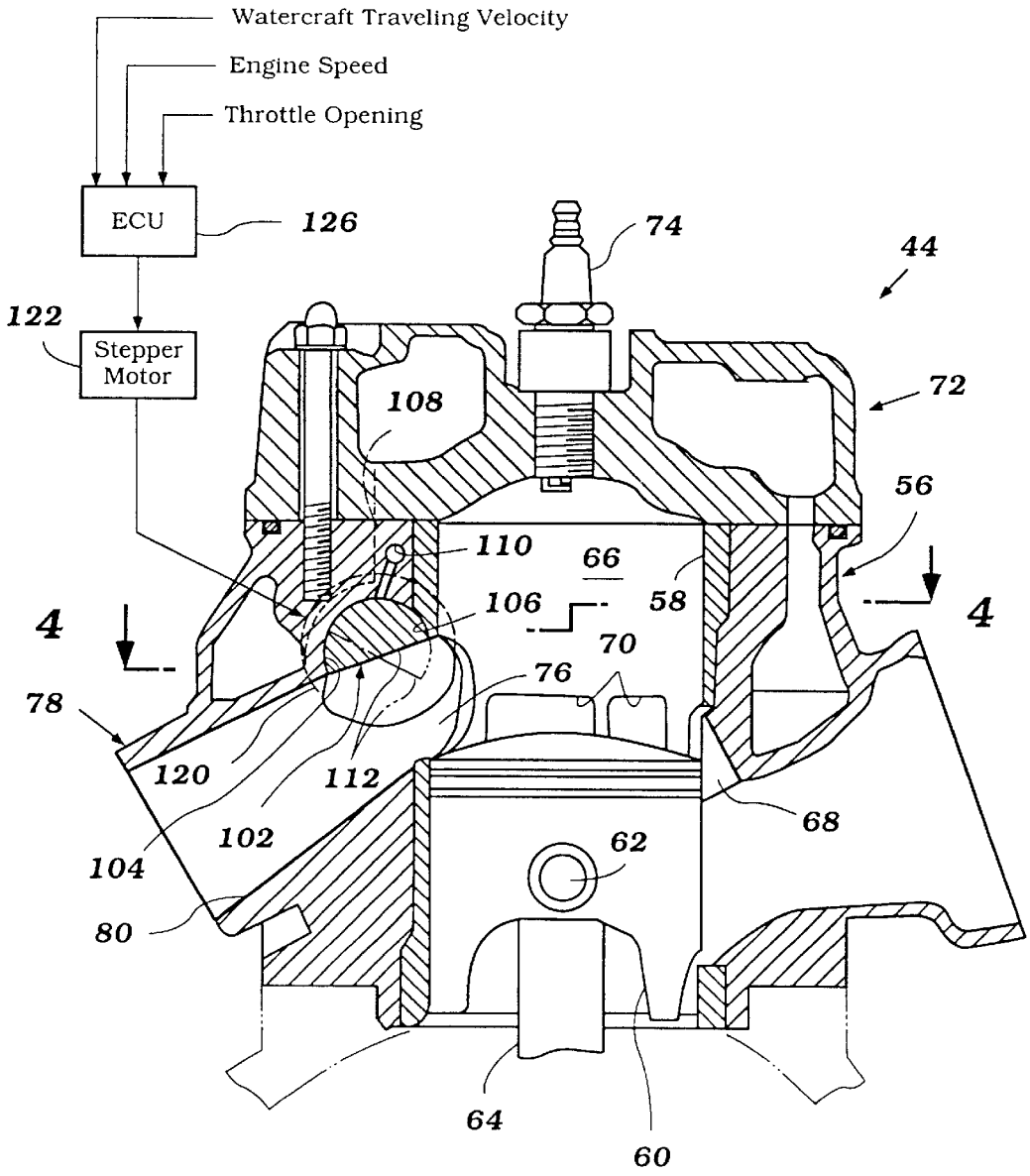
FIG. 3 is an enlarged cross-sectional view taken through a single cylinder of an engine and illustrates the exhaust control valve of the present invention.
Figure 4:
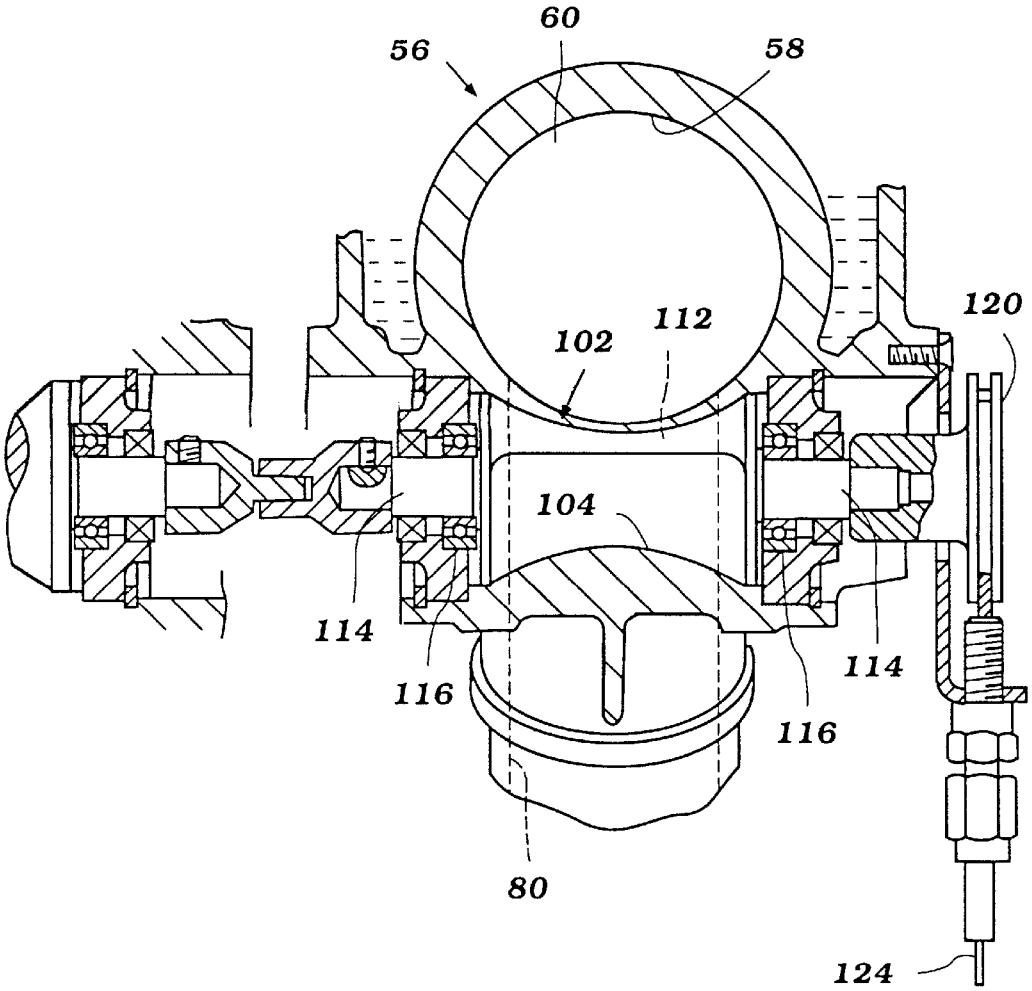
FIG. 4 is a view taken along line 4—4 of FIG. 3.

Referring now in detail to the drawings, and initially to FIGS. 2–4, a watercraft is identified generally by the reference numeral 10. The watercraft 10 is of the type known as a "personal watercraft" and is designed to be operated by a single operator or an operator accommodated by one or two passengers. The watercraft is designed to be easily boarded from the body of water in which it is operated. The actual configuration of the watercraft may vary, and those skilled in the art will readily understand how the invention can be practiced with different types of watercrafts, particularly different types of personal watercrafts.

The watercraft 10 is comprised of a hull, indicated generally by the reference numeral 12, which is made primarily of a lower hull portion 14 and an upper deck portion 16. The portions 14 and 16 are formed from a suitable material, such as a molded fiberglass, reinforced resin, or the like, and are connected to each other in any manner known in this art. Normally, the connection is provided at an outstanding flange or gunnel 18 which extends around the peripheral edge of the hull 12.

The rearward portion of the hull 12 defines a rider's area. A raised pedestal 20 is provided in this rider's area upon which a cushioned seat 22 is supported. On the sides of the pedestal 20, foot areas (not shown) are provided on which riders seated in straddle fashion on the seat may place their feet. The seat 22 has a length so that it can accommodate the operator and one or two additional passengers.

The outer sides of the foot areas are bounded by raised gunnels 24 that protect the riders. The foot areas are open at the transom of the watercraft 10 so as to facilitate boarding of the watercraft 10 from the rear. In fact, the raised pedestal 20 is disposed forwardly of the rear end of the hull 12 so as to define a rear deck 26 upon which boarding may be made.

The area of the rider's area forward of the seat 22 is provided with a steering assembly 28 which can be employed for steering of the watercraft 10. In addition, other watercraft controls, such as a throttle control, may be carried by the steering assembly 28.

The upper deck portion 16 and lower hull portion 14 of the hull 12 define a compartment. This compartment serves, at least in part, as an engine compartment 30 and extends beneath the seat 22 and terminates at its rear end in a bulkhead (not shown). A jet propulsion unit 32 is mounted within a tunnel 34 that is formed in the lower hull portion 14 rearwardly of the bulkhead. As is typical, this jet propulsion unit 32 is comprised of a water inlet opening 36 in the underside of the lower hull portion 14. Water is drawn from the water inlet opening 36 by the action of an impeller 38. The impeller 38 in turn discharges the water rearwardly to a discharge nozzle portion 40 upon which a steering nozzle 42 is mounted. The steering nozzle 42 is coupled to the steering assembly 28 for steering of the nozzle 42 about a vertically extending steering axis so as to control the direction of travel of the watercraft 10. Since the construction of the jet propulsion unit 32 itself forms no part of the invention, it will not be described further.

Mounted within the engine compartment 30 forwardly of the bulkhead and primarily beneath the forward portion of the seat is an internal combustion engine, indicated generally by the reference numeral 44. The engine 44 may be of any known type and is illustrated as being of a two-cylinder, in-line type operating on a two-stroke crankcase-compression principle. It is to be understood that this type of an engine is just typical of those with which the invention may be utilized. Those skilled in the art will understand how the invention can be employed with engines having various cylinder numbers and cylinder orientations. The invention also can be utilized in conjunction with four-cycle engines, but it does have particular utility with two-cycle engines because of the space constraints and power requirements of the personal watercraft and also the operational characteristics of two cycle engine.

The engine 44 is mounted in the lower hull portion 14 on engine mounts 46 in a manner that is well known in this art. An induction system (not shown) is disposed on one side of the engine 44. The induction system includes a plurality of carburetors (not shown) that mix a fuel charge with an air charge in a manner well known in the art. The carburetors take any known form in the art and include a throttle valve for regulating the air and fuel that is delivered to the engine. An air-fuel charge is delivered from the carburetors to a plurality of crankcase chambers (not shown) of the engine in a manner well known in the art.

A fuel 48 is positioned in the engine compartment 38 forwardly of the engine 44 and lies on the longitudinal centerline with the engine. This fuel tank supplies fuel to the carburetors in any known manner.

The engine 44 includes an output shaft 50, such as a crankshaft, which is journaled within the aforenoted crankcase chamber in any known manner. The output shaft 50 extends rearwardly through the end of the engine 44. A coupling 52 interconnects the engine output shaft 50 with an impeller shaft 54 that extends rearwardly into the jet propulsion unit 32. The impeller shaft 54 is coupled to the aforenoted impeller 38 in a known manner. This particular detail of the construction of the watercraft is not necessary to understand the construction or operation of the invention. The details of the engine 44 will now be described in more detail.

As illustrated in FIG. 3, the engine 44 is comprised of a cylinder block 56, which is formed of a suitable material such as aluminum or aluminum alloy, and contains a plurality of aligned cylinder bores 58. A piston 60 is reciprocally supported in each cylinder bore 58 and is connected by means of a piston pin 62 to the small or upper end of a respective connecting rod 64. The connecting rod 64 has its lower or big end journaled on a throw of the crankshaft 50, in a manner well known in this art.

The crankshaft 50 is rotatably journaled within a crankcase chamber (not shown). The crankcase chamber is formed by a crankcase member which is affixed to the lower end of the cylinder block 56 in any known manner. As is typical with two-cycle engines, the crankcase chambers associated with each of the cylinder bores are sealed relative to each other in any well known manner.

As previously described, an intake air charge is delivered to the individual crankcase chambers by the induction system. As is typical with two-cycle crankcase compression engines, a reed-type valve assembly (not shown) is provided in intake ports of the induction system so as to permit a fuel-air charge to flow freely into the crankcase chambers while precluding flow in the reverse direction when the charge is being compressed by downward movement of the pistons 60.

The charge which is compressed in each of the crankcase chambers is transferred to a combustion chamber 66 above the piston 60 by a scavenging system of any known type. In the illustrated embodiment, a Schnurle-type of scavenging system is employed that utilizes three circumferentially spaced scavenge passages 68 for each cylinder bore 58. The scavenge passages 68 terminate in scavenge ports 70 that are circumferentially spaced around the cylinder bores 58.

A cylinder head assembly, indicated generally by the reference numeral 72, is affixed in any suitable manner to the cylinder block 56. Together, the cylinder head assembly 72, cylinder bores 58, and heads of the pistons 60 form the combustion chambers 66 of the engine 44. In the illustrated embodiment, a spark plug 74 is mounted in the cylinder head assembly 72 to assist in the initiation of combustion at starting and during the entire running of the engine 44.

The charge which has been ignited will expand and drive the piston 60 downwardly until it opens an exhaust port 76 formed in the cylinder block. The exhaust port forms part of the exhaust system, indicated generally by the reference numeral 78, which will now be described. The exhaust ports 76 are formed at the termination of an exhaust passage 80 formed in the side of the cylinder block 56. The exhaust passage 80 discharges combustion products from the engine 44 to the atmosphere. Referring to FIG. 2, an exhaust manifold 82 is affixed to the side of the cylinder block 56 in a well known manner. The exhaust manifold 82 connects with a C-shaped pipe section 84. The outlet end of the C-shaped pipe section 84 is connected to a expansion chamber, which is indicated generally by the reference numeral 86. A catalytic converter device is disposed in the expansion chamber 85. This device takes the form of a honeycomb-type catalyst bed 88 made of a suitable catalytic material. An annular shell receives the bed 88 so that both are disposed in the expansion chamber 86. The bed 88 is designed to treat hydrocarbons, such as those found in oil, in the exhaust gases and render them harmless.

It should be noted that the catalyst bed 88 is specifically disposed above the water level under all conditions of the watercraft 10. Thus, the catalyst bed 88 will be protected from water contamination by virtue of its position above the water level under all normal conditions of the watercraft 10. The expansion chamber 86 is connected to a conduit 90 by a coupling 92. The conduit 90 communicates the expansion chamber 86 with a water-trap device 94. The water-trap device 94 is disposed within the hull 12 on one side of the tunnel 34, and more particularly, on one side of the jet propulsion unit 32. As is well known in the art, the water-trap device 94 is sized so as to provide a sufficient volume to retain water and preclude it from entering the engine 44. Internal baffles (not shown) may be provided to further preclude water from entering the engine 44. A generally U-shaped exhaust pipe 96 extends upwardly from the water-trap device 94. The exhaust pipe 96 includes a discharge end that opens into the propulsion unit 32 near the water level.

In order to provide an atmospheric air charge for the induction system, ventilation for the engine compartment 30 and cooling of the exhaust system 78 and catalyst bed 88, a ventilation system is provided. This ventilation system includes an atmospheric air inlet 98 disposed in a concealed area under the upper deck portion 16. The air inlet 98 has a construction that precludes water from being drawn into the engine compartment 30 but allows air to enter the engine compartment 30 and flow rearwardly. The ventilation system also includes a discharge conduit 100 near the rear portion of the engine compartment 30. The discharge conduit 100 has a forwardly facing opening that causes air to flow through it and be extracted to an area beneath the seat 22. Hence, the ventilation system provides a good flow of cooling and ventilating air for the components in the engine compartment 30.

The exhaust control valve assembly of the present invention will now be described. Referring to FIGS. 3 and 4, an exhaust control valve 102 is rotatably journaled within a bore 104 of the cylinder block 56. The bore surface of the cylinder block 56 forms a sliding surface 106 for the valve 102. A water jacket 108 is disposed in the cylinder block 56 and surrounds the upper part of the exhaust control valve 102 for controlling the temperature of the valve 102. The valve 102 and sliding surface 106 are constructed of the same type of material, preferably an aluminum alloy.

Constructing the valve 102 and sliding surface 106 of the same material prevents the valve 102 and sliding surface 106 from sticking because both elements have the same electrolytic potential and thermal expansion rate. Constructing the valve 102 and sliding surface 106 of the same electrolytic potential prevents excess salt deposits from sea water and air in the engine from building up on one surface compared to the other. Preventing the excess build-up of salt deposits on one of these surfaces helps eliminate corrosion and sticking between the valve 102 and sliding surface 106. Constructing the valve 102 and sliding surface 106 with the same thermal expansion rate prevents sticking between the valve 102 and sliding surface 106 caused from one element thermally expanding or contracting more than the other.

An oil passage 110 is disposed within the cylinder block 56 adjacent the exhaust control valve 102 for delivering oil to the sliding surface 106 and valve 102. The oil passage 110 terminates at an upstream end at the sliding surface 106 of the cylinder block 56 and at a downstream end at an oil supply source (not shown). The oil supply source is adapted to supply lubricating oil automatically to the sliding surface 106 when the engine is shut down. An additional maintenance switch may be provided for supplying oil to the valve 102 and sliding surface 106 when the switch is turned on. This lubrication arrangement prevents the valve 102 from sticking to the sliding surface 106. The lubrication supplied by the arrangement reduces friction and prevents salt corrosion and sticking between the valve 102 and sliding surface 106.

It is appreciated that other arrangements may be employed for preventing salt from sea water or air from corroding the valve 102 so that it sticks to the sliding surface 102. For example, a guard rail adjacent to the valve 102 and sliding surface 106 may be used to prevent the ingress of salt between the two elements. Also, a labyrinth-type arrangement may be used to remove salt from water or air in the engine or exhaust system before it reaches the valve 102 and sliding surface 106.

The exhaust control valve 102 is formed of a plurality of individual exhaust control valve elements 112. Each exhaust control valve element 112 is formed with a pair of opposing cylindrical segments 114 which are journaled by bearings 116 formed in the bore 114 on opposite sides of the exhaust passage 80. The valve 102 includes a tongue-and-groove arrangement 118 to allow for thermal expansion and contraction of the valve 102. A pulley 120 is coupled to the valve 102 for rotation of the valve 102 therewith. As illustrated schematically in FIG. 3 by the reference numeral 122, a stepper motor rotates the exhaust control valve 102. The stepper motor 122 rotates the pulley 120 and corresponding valve 102 by means of a cable 124 (See FIG. 4). As described in more detail below, the stepper motor 122 is controlled by an ECU 126 which is provided with an appropriate control strategy for positioning the control valve elements 112 in the desired position so as to maintain a high compression ratio under low-load, low speed conditions, and gradually reduce the compression ratio at certain engine and watercraft conditions so as to achieve optimal acceleration under all engine speeds and watercraft traveling velocities.

Referring to FIGS. 3–6, the control strategy and operation of the exhaust control valve 102 of the present invention will now be described in more detail. As mentioned above, the stepper motor 122 is coupled to the exhaust control valve 102 for rotation of the valve 102. The stepper motor 122 rotates the valve 102 between a first position and a second position. The angular rotation of the first position of the valve 102 is about ninety degrees from a flush position with the exhaust passage 80. Rotation of the valve 102 to the first position advances the closing of the exhaust port 76 upon upward movement of the piston 60. Hence, this position may be referred to as the advanced-closing or closed position.

The angular rotation of the second position of the valve 102 is about eighty degrees from a flush position with the exhaust passage 80. In FIG. 3, the valve 102 is shown in the second position. Rotation of the valve 102 to the second position delays the closing of the exhaust port 76 relative to the first position. Hence, this position may be referred to as the delayed-closing or open position. Advancing the closing of the exhaust port 76 increases the compression ratio in the engine 44 because compression of the charge in the combustion chamber 66 is initiated at an earlier stage. Delaying the closing of the exhaust port 76 decreases the compression ratio in the engine 44 because compression of the charge in the combustion chamber 66 is initiated at a later stage. Although the exhaust control valve 102 of the present invention is described as rotating between a first and second position, it will be apparent to those skilled in the art by the description of the valve 102 below that the valve may be rotated to a plurality of different positions between or beyond the first and second positions without departing from the spirit or scope of the present invention.

The rotation of the exhaust control valve 102 is electrically controlled by the ECU 126 based on at least one electrical input signal received by the ECU 126 from one or more of the following sensors: a throttle valve opening sensor, an engine speed sensor and/or in accordance with an important feature of the invention, a watercraft traveling velocity sensor.

Figure 5:
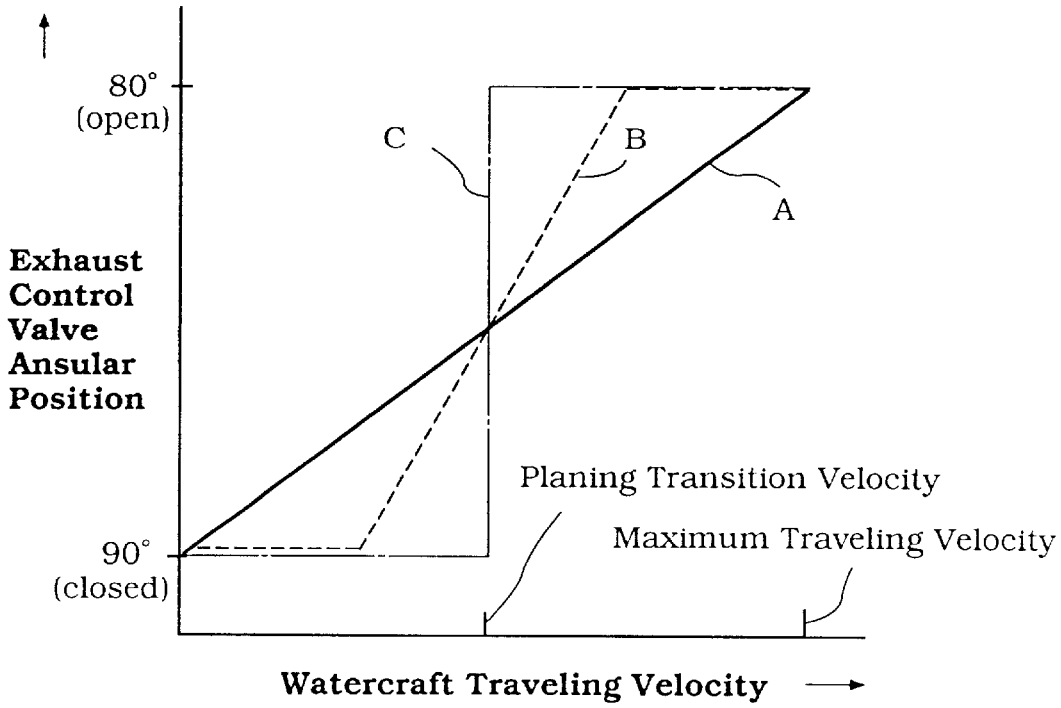
FIG. 5 is a graphical view of the valve position in relation to the traveling velocity of the watercraft.

As illustrated schematically in FIG. 3, the exhaust control valve 102 may be moved by the ECU 126 based on a traveling velocity signal produced by the watercraft velocity sensor. FIG. 5 illustrates the positioning of the valve 102 as the watercraft velocity increases and the watercraft goes from a non-planing to a planing condition. FIG. 5 also illustrates that the valve 102 may be rotated from a closed to an open position at different rates. Curve A illustrates a gradual rotation of the valve 102 as watercraft velocity increases. Curve B illustrates a less gradual rotation than that of Curve A. Curve C illustrates a sudden rotation of the valve 102 when a watercraft planing velocity is reached by the watercraft.

Figure 6:
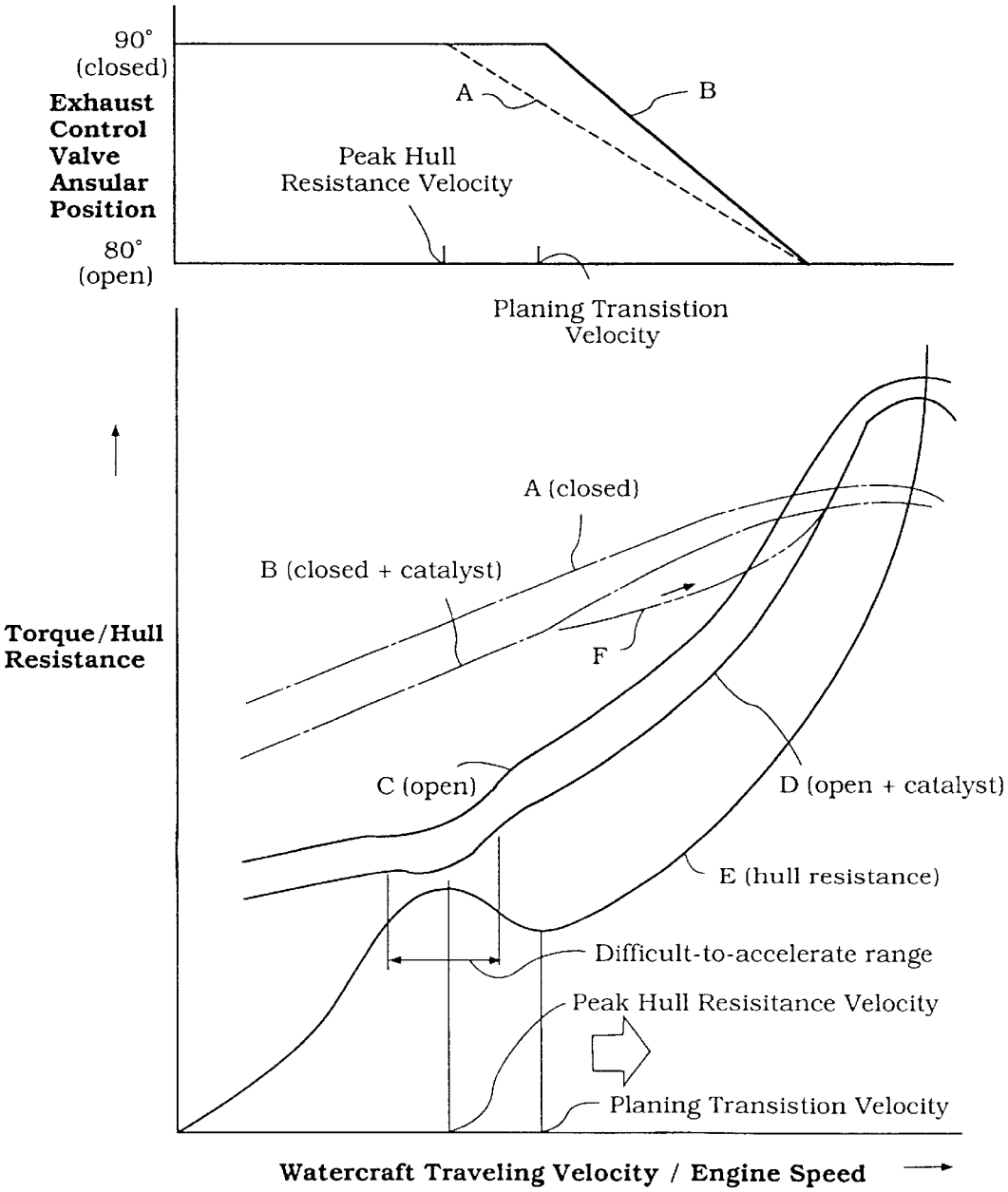
FIG. 6 is a graphical view consisting of two parts, an upper graph showing the exhaust control valve position in relation to the traveling velocity of the watercraft, and a lower graph with curves A, B, C and D showing the torque of the watercraft in relation to the traveling velocity and engine speed of the watercraft and curve E showing hull resistance in relation to traveling velocity and engine speed of the watercraft.

The top graph of FIG. 6 illustrates that the valve may start to rotate at different velocities. Curve A shows that the valve 102 may start to rotate from the closed to the open position before the watercraft reaches a planing transition velocity. Specifically, the valve 102 starts to rotate when the watercraft reaches a velocity corresponding to a peak in hull resistance. Curve B shows that the valve 102 may start to rotate when the watercraft reaches the planing transition velocity.

As illustrated schematically in FIG. 3, the exhaust control valve 102 may be rotated based on an engine speed signal produced by the engine speed sensor. It has been determined that the planing transition velocity occurs between 3,000 and 4,000 rpm. If the mean planing transition velocity is estimated to occur at 3,500 rpm, the ECU 126 may be configured to rotate the valve 102 to the closed or open position based on whether the present engine speed is below or above 3,500 rpm, respectively. If the engine speed is below 3,500 rpm, the ECU 126 will position the valve 102 is in the closed position. If the engine speed is 3,500 rpm or greater, the ECU 126 will position the valve 102 in the open position.

In a similar manner, the exhaust control valve 102 may be rotated based on a throttle valve position signal produced by the throttle valve opening sensor. If the planing transition velocity is estimated to occur at a certain throttle valve position, the ECU 126 will rotate the valve 102 to the open or closed position depending on whether that certain throttle valve position has been reached.

The engine 44 may be provided with an acceleration pump (not shown) in order to provide more responsive watercraft acceleration at low and medium watercraft velocities below the planing transition velocity. The ECU 126 reads the exhaust control valve 102 and throttle valve position. If the exhaust control valve 102 is in the closed position and the engine 44 is accelerated, the ECU 126 actuates an acceleration pump to deliver a volume of fuel to an intake air charge in the carburetor corresponding to the rate at which the throttle valve position is changed. Because this arrangement delivers a volume of fuel corresponding to the rate at which the throttle valve is rotated, as opposed to a fixed volume of fuel corresponding to the position of the throttle valve, this arrangement provides more responsive acceleration at low and medium watercraft velocities.

The watercraft velocity sensor, engine speed sensor and throttle opening sensor are well known in the art and may take any known form in the art. For this reason, the construction of these sensors are not described herein.

The exhaust control valve 102 of the present invention is configured to provide optimal acceleration at low, medium and high watercraft velocities and engine speeds. Referring to the bottom graph of FIG. 6, the acceleration that the watercraft will exhibit at a given watercraft velocity is determined by the distance between torque curves A–D and hull resistance curve E. By maximizing the distance between these curves at all watercraft velocities, optimal acceleration is provided.

Curve A is a torque curve for a watercraft engine with the exhaust control valve 102 in the closed position. Curve B is a torque curve for a watercraft engine with the exhaust control valve 102 in the closed position and a catalyst 88 provided in the exhaust system. Curve C is a torque curve for a watercraft engine with the exhaust control valve 102 in the open position. Curve D is a torque curve for a watercraft engine with the exhaust control valve 102 in the open position and a catalyst 88 provided in the exhaust system. Curves B and D are lower than curves A and C, respectively, because adding a catalyst 88 to the exhaust system 78 increases exhaust flow resistance, which has the effect of decreasing engine torque. The engine 44 delivers more torque at low and medium watercraft velocities and engine speeds when the valve 102 is in the closed position (Curves A and B) because of the higher compression ratio at these low-speed, low-load conditions. The engine delivers more torque at high watercraft velocities and engine speeds when the valve 102 is in the open position (Curves C and D) because the lower compression ratio at these high-load, high-speed conditions.

Curve E is a hull resistance curve for a watercraft. This curve exhibits a hump in resistance in the low and medium watercraft velocity ranges prior to the watercraft reaching a planing transition velocity. A "difficult-to-accelerate" range exists for the watercraft where the distance between the torque and hull resistance curves is the smallest. The difficult-to-accelerate range is indicated in the graph by a pair of vertical lines with an arrow therebetween.

Optimal watercraft acceleration is provided at all watercraft velocities by combining the high torque characteristics of a watercraft engine with the exhaust control valve 102 in the closed position (Curve B) at low and medium watercraft velocities and engine speeds and the high torque characteristics of a watercraft engine with the exhaust control valve 102 in the open position (Curve D) at high watercraft velocities and engine speeds. This is done by rotating the valve 102 to the closed position at watercraft velocities below the planing transition velocity and rotating the valve 102 to the open position at watercraft velocities at or above the planing transition velocity. By combining the high torque characteristics of the closed valve position at low and medium watercraft velocities with the high torque characteristics of the open valve position at high engine speeds, acceleration is maximized at all watercraft velocities because the distance between the torque and hull resistance curves is maximized at all watercraft velocities.

In other embodiments of the present invention, maximum acceleration may be provided by rotating the exhaust control valve 102 from a first to a second position before, during or after the watercraft 10 reaches the planing transition velocity or falls within the difficult-to-accelerate area.

Varying the valve position based solely on throttle position and/or engine speed may be problematic if the watercraft is loaded down with a few heavy riders since the ECU might mistakenly treat a high engine speed or open throttle position created by the additional load as indicating that the watercraft has reached a planing velocity when in fact it has not. Consequently, the ECU might rotate the valve to an open position even though the closed position is more appropriate for optimal watercraft acceleration. Poor acceleration would result because less than an optimal amount of torque would be delivered by the engine under the conditions. By rotating the valve 102 based on watercraft traveling velocity alone, or in addition to throttle position and engine speed, the watercraft engine delivers maximum torque under all watercraft conditions.

As mentioned above, the construction of the engine is such that it helps prevent salt from sea water and air from causing the exhaust control valves 102 to corrode and stick to the sliding surface 106. The exhaust control valve arrangement of the present invention also helps to prevent salt corrosion and sticking of the valves 102, and additionally, helps prevent destruction of the catalyst bed 88 caused by salt corrosion. Salt corrosion on the catalyst bed 88 contaminates the bed 88 and prevents it from functioning efficiently. During reciprocation of the pistons 60 in the engine, a substantial amount of overlap exists between the opening of the intake ports and the closing of the exhaust port. Such an overlap provides good scavenging in high performance at high-speed and high-load conditions. However, at low-speed and low-load conditions, this overlap may cause marine air to flow into the exhaust passages. Salt corrosion on the exhaust control valve 102 and catalyst 88 can occur because of this overlap. By rotating the valve 102 to the closed position at low and medium speed ranges, the harmful effects of scavenging are reduced.

The engine of the present invention has a construction that ensures efficient performance of the catalyst bed 88. The catalyst 88 functions most efficiently when it operates at high temperatures. The engine of the present invention runs in the stoichiometric range so that the high temperatures of the catalyst are maintained. Additionally, a butterfly valve (not shown) may be provided in the exhaust passage 110 downstream of the exhaust control valve 102 and upstream of the catalyst 88.

The butterfly valve is a pressure-sensitive valve that reflects exhaust pulses from the combustion chamber back into the combustion chamber. The reflection of exhaust pulses back into the combustion chamber increases the pressure of the air-fuel charge in the combustion chamber. As a result, combustion products are discharged at a higher temperature and pressure. These combustion products flow through the catalyst bed 88 and cause it to operate at a higher, more efficient temperature. Additionally, rotating the exhaust control valve 102 to the closed position at low and medium watercraft velocities eliminates blow-by gas phenomenon. Blow-by gases tend to cause the catalyst to run at a lower, less-efficient temperature because the hot combustion products are not entering the exhaust passage where the catalyst 88 is located.

It should be readily apparent from the foregoing description that the exhaust control valve arrangement of the present invention provides optimal watercraft acceleration at all watercraft velocities. Of course, the foregoing description is that of preferred embodiments of the invention, and various changes and modifications may be made without departing from the spirit and scope of the invention, as defined by the appended claims.

What is claimed is:

1. A two-cycle internal combustion engine for a watercraft, said engine comprising a cylinder block having a cylinder bore, a piston reciprocating in said cylinder bore, an exhaust port formed in said cylinder block extending from said cylinder bore for exhausting combustion products from said cylinder bore, an exhaust control valve cooperable with said exhaust port and movable between at least a first position for advancing the closing of said exhaust port so as to increase the compression ratio in the engine and a second position for delaying the closing of said exhaust port so as to decrease the compression ratio in the engine, and means for controlling the position of said exhaust control valve dependent upon a [water] *watercraft* condition.

2. The two-cycle engine in accordance with claim 1, wherein the watercraft condition is a planing condition of the watercraft.

3. The two-cycle engine in accordance with claim 2, wherein said exhaust valve control valve controlling means moves said valve to a first position when said watercraft is not planed, and moves said valve to a second position subsequent to said watercraft reaching a planing velocity.

4. The two-cycle internal combustion engine of claim 1, wherein the watercraft condition is watercraft velocity.

5. The two-cycle internal combustion engine of claim 4, wherein said exhaust control valve controlling means moves said valve to a first position prior to the watercraft reaching a planing transition velocity and moves said valve to a second position subsequent to said watercraft reaching a planing transition velocity.

6. A two-cycle internal combustion engine for a watercraft, said engine comprising a cylinder block having a cylinder bore, a piston reciprocating in said cylinder bore, an exhaust port formed in said cylinder block extending from said cylinder bore for exhausting combustion products from said cylinder bore, an exhaust control valve cooperable with said exhaust port and movable between at least a first position for advancing the closing of said exhaust port so as to increase the compression ratio in the engine and a second position for delaying the closing of said exhaust port so as to decrease the compression ratio in the engine, and means for controlling said exhaust control valve between said first and second position dependent upon a planing condition of said watercraft.

7. The two-cycle engine in accordance with claim 6, wherein said means controls said valve to be in said first position when said watercraft is not in a planed condition and to be in said second position when said watercraft is in a planed condition.

8. A two-cycle internal combustion engine for a watercraft, said engine comprising a cylinder block having a cylinder bore, a piston reciprocating in said cylinder bore, an exhaust port formed in said cylinder block extending from said cylinder bore for exhausting combustion products from said cylinder bore, an exhaust control valve cooperable with said exhaust port and movable between at least a first position for advancing the closing of said exhaust port so as to increase the compression ratio in the engine and a second position for delaying the closing of said exhaust port so as to decrease the compression ratio in the engine, and means for electrically controlling said exhaust control valve between said first and second position based on a condition of said watercraft.

*9. A two-cycle internal combustion engine for a watercraft, said engine comprising a cylinder block, a cylinder bore formed in said cylinder block, a piston disposed within said cylinder bore, an exhaust port formed in said cylinder block extending from said cylinder bore through which combustion products are exhausted from said cylinder bore, an exhaust control valve cooperable with said exhaust port and moveable between at least a first position for advancing the closing of said exhaust port so as to increase the compression ratio of the engine and a second position for delaying the closing of said exhaust port so as to decrease the compression ratio of the engine, and an actuator system being operably connected to the exhaust control valve, the actuator system being capable of moving the exhaust control valve based upon at least one watercraft condition.*

*10. The engine of claim 9, wherein said actuator system comprises a control unit.*

*11. The engine of claim 10, wherein said watercraft condition is a watercraft planing condition.*

*12. The engine of claim 11, wherein said actuator system is adapted to move said exhaust control valve to said first position when said watercraft is not planing and said actuator system is adapted to move said exhaust control valve to said second position when said watercraft is planing.*

*13. The engine of claim 11, wherein said planing condition is indicated, at least in part, by a preset velocity of said watercraft and said control unit receives an input velocity signal from a watercraft velocity sensor.*

*14. The engine of claim 13, wherein said actuator system is adapted to move the exhaust control valve based at least in part upon said input velocity signal from said watercraft velocity sensor.*

*15. The engine of claim 13, wherein said actuator system is adapted to move said exhaust control valve to said first position when said watercraft is not planing and said actuator system is adapted to move said exhaust control valve to said second position subsequent to said watercraft reaching a planing velocity.*

*16. The engine of claim 10, wherein said watercraft condition is watercraft velocity.*

*17. The engine of claim 16, wherein said actuator system is adapted to move said exhaust control valve to said first position prior to said watercraft reaching a planing transition velocity and said actuator system is adapted to move said exhaust control valve to said second position subsequent to said watercraft reaching said planing transition velocity.*

*18. The engine of claim 9, wherein said exhaust control valve is rotatably mounted in said cylinder block.*

*19. The engine of claim 9, wherein said actuator system further comprises a motor connected to said exhaust control valve, said motor being capable of moving said exhaust control valve.*

*20. The engine of claim 19, wherein said actuator system further comprises a flexible loop that connects said motor to said exhaust control valve.*

*21. The engine of claim 20, wherein said actuator system comprises a pulley connected to said exhaust control valve and said flexible loop wraps around at least a portion of said pulley.*

*22. The engine of claim 19, wherein said motor is a stepper motor.*

*23. An internal combustion engine for a watercraft, said engine comprising a cylinder block having a cylinder bore, a piston reciprocating in said cylinder bore, an exhaust port formed in said cylinder block extending from said cylinder bore for exhausting combustion products from said cylinder bore, an exhaust control valve cooperable with said exhaust port and movable between at least a first position for advancing the closing of said exhaust port so as to increase the compression ratio in the engine and a second position for delaying the closing of said exhaust port so as to decrease the compression ratio in the engine, and an actuator system adapted to control the position of said exhaust control valve dependent upon at least one watercraft condition.*

*24. The engine of claim 23, wherein said actuator system comprises a control unit.*

*25. The engine of claim 24, wherein said watercraft condition is a watercraft planing condition.*

*26. The engine of claim 25, wherein said actuator system is adapted to move said exhaust control valve to said first position when said watercraft is not planing and said actuator system is adapted to move said exhaust control valve to said second position when said watercraft is planing.*

*27. The engine of claim 25, wherein said planing condition is indicated, at least in part, by a preset velocity of said watercraft and said control unit receives an input velocity signal from a watercraft velocity sensor.*

*28. The engine of claim 27, wherein said actuator system is adapted to move the exhaust control valve based at least in part upon said input velocity signal from said watercraft velocity sensor.*

*29. The engine of claim 27, wherein said actuator system is adapted to move said exhaust control valve to said first position when said watercraft is not planing and said actuator system is adapted to move said exhaust control valve to said second position subsequent to said watercraft reaching a planing velocity.*

*30. The engine of claim 24, wherein said watercraft condition is watercraft velocity.*

*31. The engine of claim 23, wherein said actuator system is adapted to move said exhaust control valve to said first position prior to said watercraft reaching a planing transition velocity and said actuator system is adapted to move said exhaust control valve to said second position subsequent to said watercraft reaching said planing transition velocity.*

*32. The engine of claim 23, wherein said exhaust control valve is rotatably mounted in said cylinder block.*

*33. The engine of claim 23, wherein said actuator system further comprises a motor connected to said exhaust control valve, said motor being capable of moving said exhaust control valve.*

*34. The engine of claim 33, wherein said actuator system further comprises a flexible loop that connects said motor to said exhaust control valve.*

*35. The engine of claim 34, wherein said actuator system comprises a pulley connected to said exhaust control valve and said flexible loop wraps around at least a portion of said pulley.*

*36. The engine of claim 33, wherein said motor is a stepper motor.*

* * * * *